United States Patent [19]

Tong et al.

[11] Patent Number: 5,778,310
[45] Date of Patent: Jul. 7, 1998

[54] CO-CHANNEL INTERFERENCE REDUCTION

[75] Inventors: Wen Tong; Rui Wang, both of Ottawa, Canada

[73] Assignee: Northern Telecom Limited, Montreal, Canada

[21] Appl. No.: 565,265

[22] Filed: Nov. 30, 1995

[51] Int. Cl.$^6$ .............. H04B 1/10; H03D 3/00
[52] U.S. Cl. .......... 455/306; 455/308; 455/311; 455/501; 455/63; 455/67.3; 455/210; 455/278.1; 455/296; 375/346; 375/350; 329/318; 329/320; 329/321
[58] Field of Search .............. 455/306, 137, 455/50.1, 63, 67.3, 135, 210, 278.1, 277.2, 296, 307, 308, 311, 501; 375/346, 350; 329/318–321

[56] References Cited

U.S. PATENT DOCUMENTS 5,355,533 10/1994 Dickerson ................. 455/306
5,512,957 4/1996 Hulyalkar ................. 455/296

FOREIGN PATENT DOCUMENTS 2227907 8/1990 United Kingdom.

OTHER PUBLICATIONS

"A Modified Adaptive FIR Equalizer for Multipath Echo Cancellation in FM Transmission", K.D. Kammeyer et al., IEEE Journal on Selected Areas in Communications, vol. SAC-5, No. 2, Feb. 1987, pp. 226–237.

Quadratic Filters for Signal Processing, G.L. Sicuranza, Proceedings of the IEEE, vol. 80, No. 8, 1 Aug. 1992, pp. 1263–1285.

Primary Examiner—Donnie L. Crosland
Attorney, Agent, or Firm—R. John Haley

[57] ABSTRACT

Co-channel interference of a frequency modulated signal represented by complex signal samples is reduced by amplitude limiting each sample and non-linearly filtering the limited samples. The non-linear filter low pass filters the limited samples, multiplies the filtered samples by their complex conjugates, and high pass filters the products to produce resultant signal samples. It also squares the filtered samples, low pass filters the squared samples, multiplies the filtered squared signals by the complex conjugates of the filtered samples, combines the result with said resultant signal samples and the filtered samples, and low pass filters the combined signal to produce samples having reduced co-channel interference. The limiter and non-linear filter can be constituted by a digital signal processor.

20 Claims, 2 Drawing Sheets

CO-CHANNEL INTERFERENCE REDUCTION

This invention relates to reduction of co-channel interference in communications systems. The invention is particularly applicable to, but is not limited to, cellular radio or wireless communications systems using frequency modulation (FM) such as AMPS (Advanced Mobile Phone System), AMPS_WD (Wide-band Data AMPS), CDPD (Cellular Digital Packet Data) systems, and TDMA (Time Division Multiple Access) systems including GSM (Global System for Mobile Communications).

REFERENCE TO RELATED APPLICATIONS

Reference is directed to copending U.S. patent application Ser. No. 60/004,979 filed Oct. 10, 1995 by W. Tong et al. entitled "Co-Channel Interference Reduction".

Reference is also directed to copending U.S. patent application Ser. No. 08/545,182 filed Oct. 10, 1995 by W. Tong et al. entitled "Complex Signal Limiting", the entire disclosure of which is hereby incorporated herein by reference.

BACKGROUND OF THE INVENTION

Co-channel interference (CCI) is constituted by one or more interfering signals within the frequency band of a desired signal in a communications system, and is a key factor that limits the frequency reuse capacity of mobile communications systems. The CCI can not be reduced by conventional filtering techniques, because it falls within the bandwidth of the desired signal. One technique, described in the copending application entitled "Co-Channel Interference Reduction" referred to above, for reducing CCI is limiting of a received complex signal which comprises a mixture of a desired FM (frequency modulated) signal and an independent weaker (i.e. lower average power) CCI. The desired FM signal has a constant envelope, whereas the received signal has a non-constant envelope due to the CCI. The complex signal limiter converts the input mixture to a constant envelope signal, transforming at least half of the CCI energy outside the bandwidth of the desired signal so that it can be filtered out by a low pass filter.

As described in the copending application entitled "Co-Channel Interference Reduction" referred to above, the complex signal limiting is supplemented by non-linear filtering of the output of the complex signal limiter. The non-linear filtering has no effect in one of two cases described in that application; in the other of the two cases it provides substantial additional CCI cancellation (CCIC), so that an average CCIC gain due to the complex signal limiter and non-linear filter (CLNF) approaches 6 dB.

An object of this invention is to provide an improved method of reducing co-channel interference of a frequency modulated received signal, and a non-linear filter for use in carrying out the method, which can provide a further increase in CCIC gain.

SUMMARY OF THE INVENTION

According to one aspect, this invention provides a method of reducing co-channel interference of a frequency modulated received signal, having a predetermined signal bandwidth, represented by a complex signal having samples $x(k)$ where k is an integer, comprising the steps of: amplitude limiting each sample to produce a limited sample substantially equal to $x(k)/|x(k)|$; and non-linearly filtering the limited samples to enhance cancellation of co-channel interference, the step of non-linearly filtering comprising the steps of: producing different derivatives of the limited samples, the different derivatives including a derivative of at least one second or higher order power of the limited samples; combining the different derivatives in a manner to enhance the cancellation of co-channel interference in the combination; and low pass filtering at least one of the derivatives, the limited samples, and the combination in accordance with the predetermined signal bandwidth.

For clarity, it is observed here that the term "derivative" is used here in accordance with its general meaning of one signal being derived from another, and not in its limited mathematical sense referring to the rate of change of a function.

Preferably the limited samples are low pass filtered in accordance with the predetermined signal bandwidth to produce filtered samples, and the different derivatives are produced from the filtered samples. Preferably also the step of producing different derivatives includes the steps of producing squared filtered samples and low pass filtering the squared filtered samples, and the steps of producing and combining the different derivatives include the step of forming a product of the low pass filtered, squared filtered samples with a complex conjugate of the filtered samples.

In a preferred embodiment of the method, the steps of producing and combining the different derivatives further include the steps of producing a product of the filtered samples with a complex conjugate of the filtered samples and removing d.c. components from the product to produce a resultant signal, and further include the steps of producing a product of the filtered samples, a constant 3, and said resultant signal, forming a difference between this product and a sum of the filtered samples and said product of the low pass filtered, squared filtered samples with the complex conjugate of the filtered samples, and low pass filtering the difference in accordance with the predetermined signal bandwidth.

Conveniently, to facilitate the low pass filtering, the step of low pass filtering the squared filtered samples comprises the sequential steps of up-sampling by a factor of 2, low pass filtering, and down-sampling by a factor of 2.

The invention also provides a non-linear filter for reducing co-channel interference of a frequency modulated signal having a predetermined signal bandwidth and represented by amplitude limited complex signal samples, the non-linear filter comprising: a first signal path including complex signal processing units arranged to multiply the complex signal samples by their complex conjugates and to high pass filter the products to produce resultant signal samples from which d.c. components are removed; a second signal path including complex signal processing units arranged to produce derivative signal samples of at least one second or higher order power of the complex signal samples; and complex signal combining units arranged to combine the resultant signal samples of the first signal path, the derivative signal samples of the second signal path, and the complex signal samples to produce combined signal samples having less co-channel interference than the complex signal samples.

The non-linear filter preferably includes a low pass filter, having a pass band corresponding to the predetermined signal bandwidth, via which the complex signal samples are supplied, and a low pass filter, having a pass band corresponding to the predetermined signal bandwidth, arranged to filter the combined signal samples to produce output signal samples of the non-linear filter.

Preferably the complex signal processing units of the second signal path include a multiplier arranged to square the complex signal samples, a low pass filter arranged to filter the squared samples, and a multiplier arranged to multiply the filtered squared signals by the complex conjugates of the complex signal samples to produce the derivative signal samples. Conveniently, the complex signal processing units of the second signal path further include a two-times up-sampler preceding the low pass filter and a two-times down-sampler following the low pass filter.

The complex signal processing and combining units are preferably provided as functions of a digital signal processor.

The invention further provides apparatus for reducing co-channel interference of a frequency modulated received signal, having a predetermined signal bandwidth, represented by a complex signal having samples x(k) where k is an integer, the apparatus comprising: a complex signal limiter arranged to limit each sample to produce a limited sample substantially equal to x(k)/|x(k)|; and a non-linear filter as recited above to which the limited samples are supplied as said complex signal samples.

BRIEF DESCRIPTION OF THE DRAWINGS

The invention will be further understood from the following description with reference to the accompanying drawings, in which.

DETAILED DESCRIPTION

Figure 1:
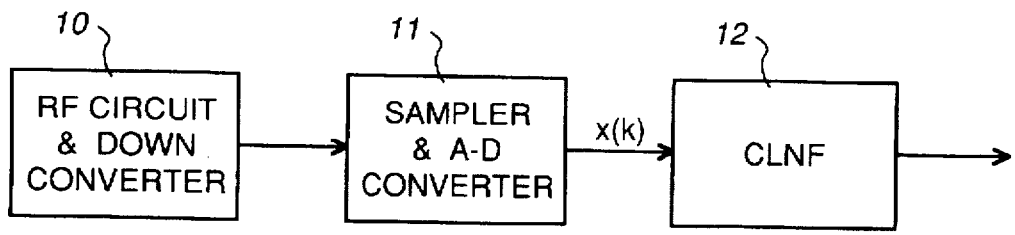
FIG. 1 illustrates a block diagram of parts of a wireless digital communications receiver including a complex signal limiter and non-linear filter (CLNF) in accordance with this invention.

Referring to FIG. 1, a block diagram illustrates parts of a wireless communications receiver, in which an FM communications signal is received by an RF (radio frequency) receiver circuit and down converter 10 to produce a signal which is sampled and the samples converted into digital form by a sampler and A-D (analog-to-digital) converter 11. For reducing co-channel interference (CCI) signals which are within the bandwidth of the desired signal, the digital samples are supplied to a complex signal limiter and non-linear filter (CLNF) 12. The output of the CLNF 12 is supplied, optionally via further CCI reducing units (not shown), to an FM demodulator (not shown). Where the receiver system is part of a cellular radio communications system, the CCI may for example be due to frequency reuse in other cells of the system, and/or it may originate from sources external to the communications system. The CLNF 12 is implemented in a dsp (digital signal processor) integrated circuit, which desirably also implements other processing functions in the receiver system.

For simplicity, it is assumed in the following description that the desired signal occupies an AMPS voice channel, but it should be understood that the invention is applicable to other systems in which an FM signal (including frequency shift keyed signals) is subject to co-channel interference. As is well known, an AMPS voice channel has a bandwidth of 30 kHz and carries a constant (amplitude) envelope FM signal which comprises a voice signal with a modulation frequency in the range from 300 to 3400 Hz and a supervisory audio tone (SAT) with a modulation frequency around 6 kHz, and can also include a signalling tone (ST) with a modulation frequency of 10 kHz. The peak deviation, or range of frequency change, of these modulating signals, and of wide-band data which can also be carried by the voice channel, is typically 8 kHz or less. The sampling rate is about 48 kHz.

In the following, the desired AMPS signal is denoted as a complex signal $A_s e^{j\psi_s(k)}$ with in-phase and quadrature-phase components, where $A_s$ is the amplitude and $\psi_s(k)$ is the phase of each sample k of the complex signal. The first order difference of the phase is referred to as the instantaneous frequency $\dot{\psi}_s(k)$, and the second order difference $\ddot{\psi}_s(k)$ is referred to as the variation speed of the instantaneous frequency. Thus $\dot{\psi}_s(k)=\psi_s(k)-\psi_s(k-1)$ and $\ddot{\psi}_s(k)=\dot{\psi}_s(k)-\dot{\psi}_s(k-1)$.

The CLNF 12 serves as described below to improve the signal-to-interference (C/I) ratio of the sampled signal by a factor which is referred to as the CCI cancellation (CCIC) gain of the CLNF.

Figure 2:
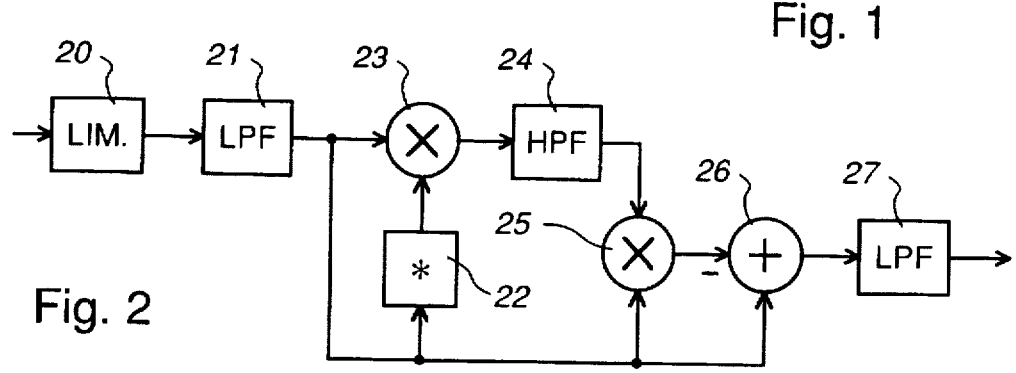
FIG. 2 schematically illustrates a form of the CLNF which is described in the copending application entitled "Co-Channel Interference Reduction" referred to above.

Referring to FIG. 2, in a form of the CLNF which is described in the copending application entitled "Co-Channel Interference Reduction" referred to above, the CLNF 12 comprises a complex signal limiter 20, low pass filters (LPFs) 21 and 27, a complex conjugate function 22, complex signal multipliers 23 and 25, a high pass filter (HPF) 24, and a complex signal adder 26. Each of the LPFs 21 and 27 provides low pass filtering of each of the real and imaginary components of the complex signal supplied to it, and has a bandwidth of 15 kHz corresponding to that of the desired signal (30 kHz, this being centered on 0 kHz for the LPF). The functions of the CLNF are conveniently implemented in a dsp; thus for example a single LPF function of the dsp can be used to implement both LPFs 21 and 27. Each LPF preferably has a short impulse response to reduce processing delay, and for example can be a Butterworth or Gaussian filter.

The complex signal limiter 20 is supplied with an input signal x(k) which is assumed to be a mixture of a desired signal as indicated above and a weaker CCI signal having amplitude $A_i$ and phase $\psi_i(k)$. Thus $$x(k)=A_s e^{j\psi_s(k)}+A_i e^{j\psi_i(k)}$$

The complex signal limiter 20 produces a complex output signal $x_{lim}(k)$ in accordance with the non-linear function:

$$x_{lim}(k)=\frac{x(k)}{|x(k)|}=\frac{x(k)}{(x(k)x^*(k))^{0.5}}$$

where $x^*(k)$ is the complex conjugate of $x(k)$. Putting $\beta=A_i/A_s$ (i.e. the input signal to interference ratio is $1/\beta$) and assuming that the C/I ratio is high, i.e. $\beta \ll 1$, then using Taylor expansion and neglecting higher-order terms gives $$x_{lim}(k) = e^{j\psi_s(k)} + \frac{\beta}{2} e^{j\psi_i(k)} - \frac{\beta}{2} e^{j(2\psi_s(k)-\psi_i(k))} \quad (1)$$

from which it can be seen that the signal to interference ratio of the output signal $x_{lim}(k)$ is $1/(2(\beta/2)^2)$, so that the CCIC gain of the complex signal limiter 20 is 3 dB. A second order Taylor expansion can be carried out, from which it can be determined that an upper bound of the complex signal limiter CCIC gain is $2(1-1.31\beta^2)$, which approaches 3 dB as $\beta$ approaches zero.

The complex signal limiter 20 desirably operates in the manner described fully in the copending application entitled "Complex Signal Limiting" referred to above.

The CCIC gain of the complex signal limiter 20 is enhanced by the remainder of the CLNF 12 which constitutes a non-linear filter. More particularly, the units 21 to 27 of the CLNF 12 serve to reduce the dominant or first order CCI terms in the output of the complex signal limiter 20, i.e. the second and third terms in the last equation for $x_{lim}(k)$ above.

The output of the complex signal limiter 20 is filtered by the LPF 21, whose output is supplied to one input of each of the complex signal multipliers 23 and 25, to one input of the complex signal adder 26, and via the complex conjugate function 22 to a second input of the complex signal multiplier 23. The output of the complex signal multiplier 23 is supplied via the HPF 24, which serves to remove d.c. components and can for example be an IIR (infinite impulse response) filter having a characteristic of the form $(1-z^{-1})/(1-0.95\ z^{-1})$, to a second input of the complex signal multiplier 25, whose output is supplied to a subtracting input of the complex signal adder 26. The output of the complex signal adder 26 is low pass filtered by the LPF 27.

The operation of the units 21 to 27 is explained below with reference to two cases. For convenience, the terminology $x_N(k)$ is used to denote the output signal from the unit having the reference N. For example, $x_{21}(k)$ refers to the output of the LPF 21.

Case 1—Instantaneous frequency difference $2\dot\psi_s(k)-\dot\psi_i(k)$ is within the LPF bandwidth.

In this case the output $x_{27}(k)$ is the same as the input $x_{lim}(k)$. This can be seen from the fact that the LPF 21 has no effect so that $x_{21}(k)=x_{lim}(k)$, with the result that $x_{23}(k)= x_{21}(k)x_{22}(k)=x_{21}(k)x_{21}^*(k)=1$. This is a d.c. component which is eliminated by the HPF 24 so that $x_{24}(k)=0$, and hence $x_{25}(k)=0$. Hence $x_{26}(k)=x_{21}(k)=x_{lim}(k)$ which is within the bandwidth of the LPF 27 so that $x_{27}(k)=x_{lim}(k)$. Thus there is no improvement in the CCIC gain of 3 dB due to the units 21 to 27 of the CLNF 12 in this case.

Case 2—Instantaneous frequency difference $2\dot\psi_s(k)-\dot\psi_i(k)$ is outside the LPF bandwidth.

In this case the first order terms in the equation for $x_{lim}(k)$ above are cancelled. The LPF 21 filters out the third term in equation (1) for $x_{lim}(k)$ above. Consequently, the output signals of the units 21 and 23 to 27, neglecting second order ($\beta^2$) terms, are given by the following equations:

$$x_{21}(k) = e^{j\psi_s(k)} + \frac{\beta}{2} e^{j\psi_i(k)}$$

$$x_{23}(k) = 1 + \frac{\beta}{2} e^{j(\psi_i(k)-\psi_s(k))} + \frac{\beta}{2} e^{j(\psi_s(k)-\psi_i(k))}$$

$$x_{24}(k) = \frac{\beta}{2} e^{j(\psi_i(k)-\psi_s(k))} + \frac{\beta}{2} e^{j(\psi_s(k)-\psi_i(k))}$$

$$x_{25}(k) = \frac{\beta}{2} e^{j\psi_i(k)} + \frac{\beta}{2} e^{j(2\psi_s(k)-\psi_i(k))}$$

$$x_{26}(k) = e^{j\psi_s(k)} - \frac{\beta}{2} e^{j(2\psi_s(k)-\psi_i(k))}$$

$$x_{27}(k) = e^{j\psi_s(k)}$$

Thus the CCIC gain due to the CLNF 12 becomes very large (ideally infinite) in this case.

Assuming that the two cases above are equally probable, there is an average improvement of the CCIC due to the CLNF 12 by a factor of 2 over the complex signal limiter 20 alone, and a total CCIC gain for the CLNF 12 approaching 6 dB as $\beta$ approaches 0.

Figure 3:
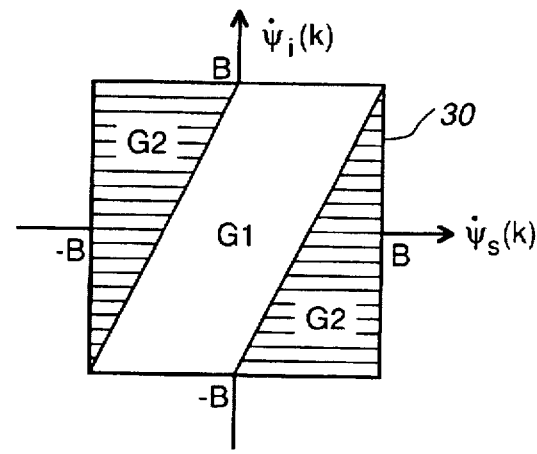
FIG. 3 shows a graph of instantaneous frequencies which is useful in explaining operation of the CLNF of FIG. 2.

The present inventors have realized that the operation of the non-linear filter of the CLNF 12 as described above can be represented by a graph as shown in FIG. 3, in which the axes represent the instantaneous frequencies $\dot\psi_s(k)$ and $\dot\psi_i(k)$ of the desired signal and the interference respectively. As can be appreciated from the above description, each of these instantaneous frequencies can vary within the signal bandwidth ($\pm 15$ kHz for an AMPS signal as described above), so that the instantaneous frequencies can vary within a square area 30 centered on the origin of the instantaneous frequency axes in FIG. 3. If $\pm B$ represents the signal bandwidth centered on 0 kHz, then the sides of the square area 30—intercept the axes at $\pm B$ as shown in FIG. 3. For clarity, the axes are not shown within this square area 30 in FIG. 3. Assuming that the instantaneous frequencies $\dot\psi_s(k)$ and $\dot\psi_i(k)$ are uniformly distributed and statistically independent within the signal bandwidth, then there is an equal probability distribution for all points in the square area 30.

Within the area 30, case 1 above corresponds to a white area identified G1, and case 2 above corresponds to areas identified G2 and marked by horizontal lines. G1 and G2 are also used to represent the CCIC gains for the two cases and hence for points in the respective areas. It can be seen that, consistent with the criterion above for distinguishing between cases 1 and 2, the boundary lines between the areas G0 and G2 satisfy the equation $2\dot\psi_s(k)-\dot\psi_i(k)=\pm B$. Assuming an equal probability distribution as indicated above, the white area G1 represents a probability P1 for case 1 discussed above for which the CCIC gain is G1, and the areas G2 represent a probability P2 for case 2 discussed above for which the CCIC gain is increased to G2. The overall CCIC gain G is given by:

$$G = \left( \sum_{i=1}^{n} \frac{P_i}{G_i} \right)^{-1} \quad (2)$$

where n is the number of areas; for FIG. 2, n=2.

The present invention starts from this new understanding, and extends this by recognizing that a further improvement in CCIC gain can be achieved if the white area G1 in the graph can be reduced while still maintaining large (ideally infinite) CCIC gains in other areas of the graph outside of the white area. More particularly, the invention recognizes that more extensive processing of the limited complex signal in the non-linear filter can result in the graph of FIG. 3 being divided up into a greater number of areas, in which the white area G1 is reduced and the other areas have sufficiently high ratios of CCIC gain to probability (i.e. area) that the overall CCIC gain G given by equation (2) is enhanced.

Although there will be a diminishing return on the improvement in overall CCIC gain with successive increases of processing, and the nature of the required processing must be determined in order to produce the desired improvement in overall CCIC gain, the present invention provides at least some forms of the CLNF 12 as described below in which a significant improvement in overall CCIC gain is provided with very little increase in processing. It is envisaged that other forms of the CLNF, which may involve higher order powers of the complex signal samples and more extensive processing, can be devised which would provide even further improvements in CCIC gain.

Figure 4:
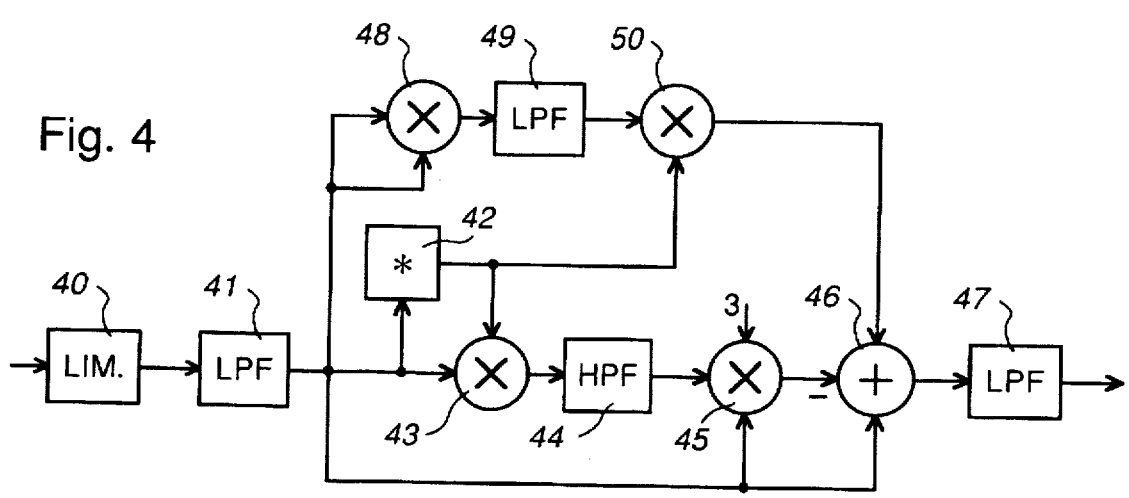
FIG. 4 schematically illustrates a form of the CLNF in accordance with an embodiment of this invention.

Referring to FIG. 4, there is illustrated an improved form of the CLNF 12 which comprises units and functions 40 to 47 which are the same as the units and functions 20 to 27 respectively as described above with reference to FIG. 2 and are arranged in the same manner, except that the complex signal multiplier 45 is provided with an additional multiplication by a constant 3, and the complex signal adder 46 is provided with an additional summing input. The CLNF 12 of FIG. 4 further comprises a complex signal multiplier 48 arranged to square the output of the LPF 41, an LPF 49 arranged to low pass filter the output of the complex signal multiplier 48, and a complex signal multiplier 50 arranged to multiply the output of the LPF 49 by the complex conjugate output of the function 42, the output of this complex signal multiplier being supplied to the additional summing input of the complex signal adder 46.

Like the LPFs 41 and 47, the LPF 49 has a short impulse response and a bandwidth corresponding to the signal bandwidth. However, this is twice the bandwidth of the LPFs 41 and 47, because the signal bandwidth is doubled by the squaring provided by the immediately preceding complex signal multiplier 48. While the dsp in which the CLNF 12 is implemented could include a separate LPF function for the LPF 49, this complication can be easily avoided by the modified form of the CLNF of FIG. 4 shown in FIG. 5.

Figure 5:
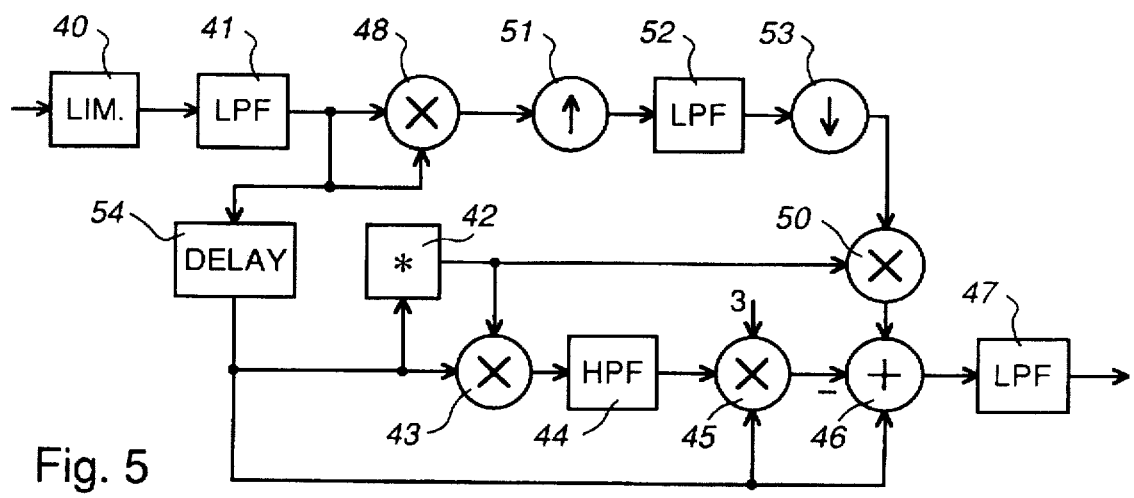
FIG. 5 schematically illustrates a modified form of the CLNF of FIG. 4.

The modified form of the CLNF 12 shown in FIG. 5 is the same as that of FIG. 4, except that the LPF 49 of FIG. 4 is replaced by consecutive functions 51 to 53, and a compensating complex signal delay 54 is provided in the complex signal path from the LPF 41 to the units and functions 42, 43, 45, and 46. The function 51 is a two-times up-sampler or interpolation function, the function 52 is a LPF which can be identical to the LPFs 41 and 47, and the function 53 is a two-times down-sampler or decimator. The combination of these functions corresponds to the double-bandwidth LPF 49 of FIG. 4, but is more easily implemented in the dsp because the same LPF function which already exists for the LPFs 41 and 47 can be reused for the LPF 52. The functions 51 to 53 also introduce a delay of for example two sample periods, this is compensated in the parallel paths to the output of the CLNF 12 by the delay function 54.

For simplicity and clarity in the following description of the operation of the CLNF, reference is made only to the CLNF 12 of FIG. 4, but it should be appreciated that similar comments apply equally to the modified CLNF 12 of FIG. 5.

Figure 6:
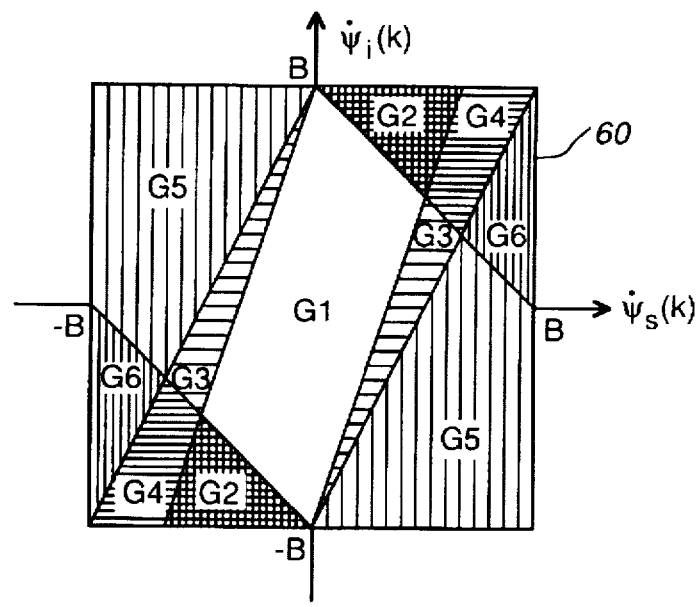
FIG. 6 shows a graph of instantaneous frequencies which is useful in explaining operation of the CLNF of FIGS. 4 and 5.

FIG. 6 shows a graph which illustrates the operation of the CLNF 12 of FIG. 4 in a similar manner to the illustration in FIG. 3 of the operation of the CLNF 12 of FIG. 2. For the CLNF 12 of FIG. 4, six cases are considered below and are represented in FIG. 6 by areas G1 to G6 within the area 60, with CCIC gains also denoted by the same references. For clarity in distinguishing these areas in FIG. 6, the area G1 is white, the areas G2 are checked, and the areas G3 to G6 are shown respectively with wide-spaced horizontal lines, narrow-spaced horizontal lines, wide-spaced vertical lines, and narrow-spaced vertical lines. Consistent with the criteria for distinguishing the six cases discussed below, the boundary lines of the areas G1 to G6 satisfy the equations $2\psi_s(k)-\psi_i(k)=\pm B$, $3\psi_s(k)-\psi_i(k)=\pm B$, and $\psi_s(k)+\psi_i(k)=\pm B$.

In the following consideration of the six cases, second order ($\beta^2$) terms in the equations are ignored, and a similar notation to that described above is used, for example $x_{48}(k)$ refers to the output of the complex signal multiplier 48.

Cases 1 to 4—Instantaneous frequency difference $2\psi_s(k)-\psi_i(k)$ is within the signal bandwidth.

In these cases $$x_{41}(k) = x_{khm}(k) = e^{j\psi_s(k)} + \frac{\beta}{2} e^{j\psi_i(k)} - \frac{\beta}{2} e^{j(2\psi_s(k)-\psi_i(k))}$$

and the output of the complex conjugate function 42 is $$x_{42}(k) = e^{-j\psi_s(k)} + \frac{\beta}{2} e^{-j\psi_i(k)} - \frac{\beta}{2} e^{-j(2\psi_s(k)-\psi_i(k))}$$

so that, similarly to the description above in relation to FIG. 2, $x_{43}(k)=1$ and hence $x_{44}(k)=x_{45}(k)=0$. The output of the complex signal multiplier 48 is $$x_{48}(k)=(x_{41}(k))^2=e^{j2\psi_s(k)}+\beta e^{j(\psi_s(k)+\psi_i(k))}-\beta e^{j(3\psi_s(k)-\psi_i(k))}$$

It can be observed at this point that the exponents in the second and third terms of the above equation for $x_{48}(k)$ correspond to the boundary line equations above for the subdivision of the area 60 into the additional areas as shown in FIG. 6.

Case 1—$3\psi_s(k)-\psi_i(k)$ and $\psi_s(k)+\psi_i(k)$ are within the signal bandwidth.

In this case (FIG. 6 area G1) the LPF 49 has no effect, so that $x_{49}(k)=x_{48}(k)$ and $$x_{50}(k) = x_{49}(k)x_{42}(k) = e^{j\psi_s(k)} + \frac{\beta}{2} e^{j\psi_i(k)} - \frac{\beta}{2} e^{j(2\psi_s(k)-\psi_i(k))}$$

$$x_{47}(k)=x_{46}(k)=x_{41}(k)-x_{45}(k)+x_{50}(k)=2e^{j\psi_s(k)}+\beta e^{j\psi_i(k)}-\beta e^{j(2\psi_s(k)-\psi_i(k))}$$

from which it can be seen that there is no improvement, i.e. the CCIC gain G1=3 dB.

Case 2—$3\psi_s(k)-\psi_i(k)$ is within, $\psi_s(k)+\psi_i(k)$ is outside the signal bandwidth.

In this case (FIG. 6 areas G2) the LPF 49 filters the out-of-band component of $x_{48}(k)$ so that $$x_{49}(k) = e^{j2\psi_s(k)} - \beta e^{j(3\psi_s(k)-\psi_i(k))}$$

$$x_{50}(k) = x_{42}(k)x_{49}(k) = e^{j\psi_s(k)} - \frac{\beta}{2} e^{j\psi_i(k)} - \frac{\beta}{2} e^{j(2\psi_s(k)-\psi_i(k))}$$

$$x_{47}(k) = x_{46}(k) = x_{41}(k) - x_{45}(k) + x_{50}(k) = 2e^{j\psi_s(k)} - \beta e^{j(2\psi_s(k)-\psi_i(k))}$$

from which it can be seen that the CCIC gain G2=6 dB.

Case 3—$3\psi_s(k)-\psi_i(k)$ is outside, $\psi_s(k)+\psi_i(k)$ is within the signal bandwidth.

In this case (FIG. 6 areas G3) the LPF 49 filters the out-of-band component of $x_{49}(k)$ so that $$x_{49}(k) = e^{j2\psi_s(k)} - \beta e^{j(3\psi_s(k)-\psi_i(k))}$$

$$x_{50}(k) = x_{42}(k)x_{49}(k) = e^{j\psi_s(k)} + \frac{\beta}{2} e^{j\psi_i(k)} + \frac{\beta}{2} e^{j(2\psi_s(k)-\psi_i(k))}$$

$$x_{47}(k) = x_{46}(k) = x_{41}(k) - x_{45}(k) + x_{50}(k) = 2e^{j\psi_s(k)} + \beta e^{j\psi_i(k)}$$

from which it can be seen that the CCIC gain G3=6 dB.

Case 4—$3\psi_s(k)-\psi_i(k)$ and $\psi_s(k)+\psi_i(k)$ are outside the signal bandwidth.

In this case (FIG. 6 areas G4) the LPF 49 filters both out-of-band components of $x_{49}(k)$ so that $$x_{49}(k) = e^{j2\psi_s(k)}$$

$$x_{50}(k) = x_{42}(k)x_{49}(k) = e^{j\psi_s(k)} - \frac{\beta}{2} e^{j\psi_i(k)} + \frac{\beta}{2} e^{j(2\psi_s(k)-\psi_i(k))}$$

$$x_{47}(k) = x_{46}(k) = x_{41}(k) - x_{45}(k) + x_{50}(k) = 2e^{j\psi_s(k)}$$

from which it can be seen that the CCIC gain G4 is very large (ideally infinite).

Cases 5 & 6—Instantaneous frequency difference $2\psi_s(k)-\psi_i(k)$ is outside the signal bandwidth.

In these cases, similarly to the description above in relation to FIG. 2, $$x_{41}(k) = e^{j\psi_s(k)} + \frac{\beta}{2} e^{j\psi_i(k)}$$

$$x_{42}(k) = e^{-j\psi_s(k)} + \frac{\beta}{2} e^{-j\psi_i(k)}$$

$$x_{43}(k) = 1 + \frac{\beta}{2} e^{j(\psi_i(k)-\psi_s(k))} + \frac{\beta}{2} e^{j(\psi_s(k)-\psi_i(k))}$$

$$x_{44}(k) = \frac{\beta}{2} e^{j(\psi_i(k)-\psi_s(k))} + \frac{\beta}{2} e^{j(\psi_s(k)-\psi_i(k))}$$

With the additional multiplication by the constant 3 in the complex signal multiplier 45

$$x_{45}(k) = 3x_{41}(k)x_{44}(k) = \frac{3\beta}{2} e^{j\psi_s(k)} + \frac{3\beta}{2} e^{j(2\psi_s(k)-\psi_i(k))}$$

The output of the complex signal multiplier 48 is $$x_{48}(k) = (x_{41}(k))^2 = e^{j2\psi_s(k)} + \beta e^{j(\psi_s(k)+\psi_i(k))}$$

Case 5—$\psi_s(k)+\psi_i(k)$ is within the signal bandwidth.

In this case (FIG. 6 areas G5) the LPF 49 has no effect so that $x_{49}(k)=x_{48}(k)$ and $$x_{50}(k) = x_{42}(k)x_{49}(k) = e^{j\psi_s(k)} + \beta e^{j\psi_i(k)} + \frac{\beta}{2} e^{j(2\psi_s(k)-\psi_i(k))}$$

$$x_{46}(k) = x_{41}(k) - x_{45}(k) + x_{50}(k) = 2e^{j\psi_s(k)} - \beta e^{j(2\psi_s(k)-\psi_i(k))}$$

the last component of which is removed by the LPF 47 so that $$x_{47}(k) = 2e^{j\psi_s(k)}$$

from which it can be seen that the CCIC gain G5 is very large (ideally infinite).

Case 6—$\psi_s(k)+\psi_i(k)$ is outside the signal bandwidth.

In this case (FIG. 6 areas G6) the LPF 49 filters the out-of-band component of $x_{48}(k)$ so that $$x_{49}(k) = e^{j2\psi_s(k)}$$

$$x_{50}(k) = x_{42}(k)x_{49}(k) = e^{j\psi_s(k)} + \frac{\beta}{2} e^{j(2\psi_s(k)-\psi_i(k))}$$

$$x_{46}(k) = x_{41}(k) - x_{45}(k) + x_{50}(k) = 2e^{j\psi_s(k)} - \beta e^{j\psi_i(k)} - \beta e^{j(2\psi_s(k)-\psi_i(k))}$$

the last component of which is removed by the LPF 47 so that $$x_{47}(k) = 2e^{j\psi_s(k)} - \beta e^{j\psi_i(k)}$$

from which it can be seen that the CCIC gain G6=6 dB.

These CCIC gain results $G_i$ and the associated probabilities $P_i$, corresponding to the respective areas in FIG. 6, are summarized for the six cases or values of i in the following Table:

| 1 | 1 | 2 | 3 | 4 | 5 | 6 |
|---|---|---|---|---|---|---|
| $G_i$ | 3 dB | 6 dB | 6 dB | large | large | 6 dB |
| $P_i$ | 3/12 | 1/12 | 1/12 | 1/12 | 5/12 | 1/12 |

Applying equation (2) to these values gives an overall CCIC gain which approaches 8 dB as $\beta$ approaches 0.

Figure 7:
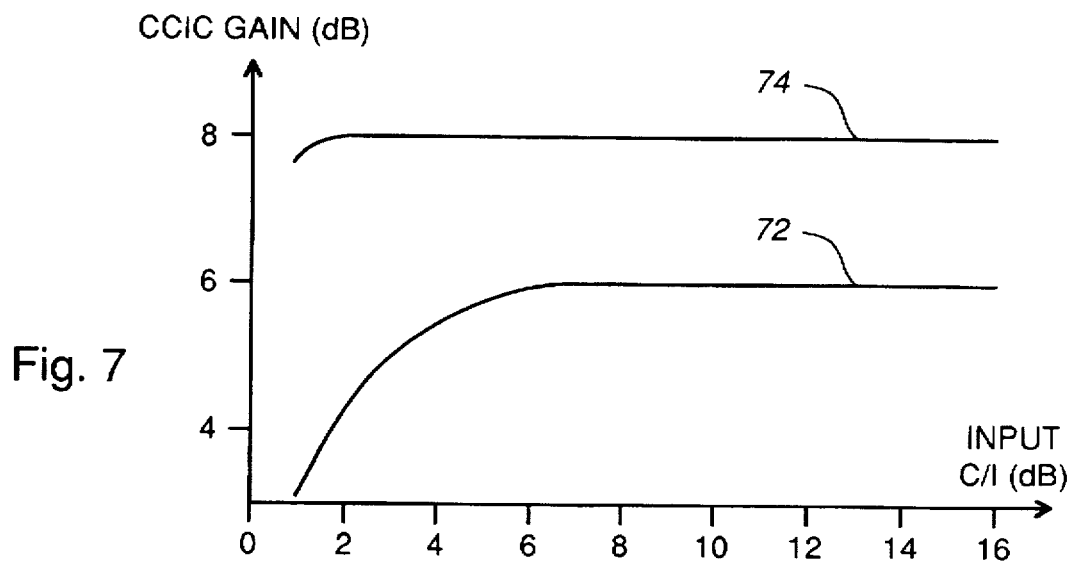
FIG. 7 shows a graph illustrating co-channel interference cancellation (CCIC) gain characteristics as a function of signal to interference ratio (C/I).

FIG. 7 shows a graph of overall CCIC gain against the input signal to interference ratio, a line 72 representing the CCIC gain characteristic for the CLNF of FIG. 2 and a line 74 representing the CCIC gain characteristic for the CLNF of FIG. 4 or FIG. 5. It can be seen from this graph that the CLNF of FIG. 4 or FIG. 5 not only provides a significant enhancement of overall CCIC gain over that of the CLNF of FIG. 2, but it maintains its CCIC gain at lower input signal-to-interference ratios (e.g. less than 6 dB as illustrated) where the need for an enhanced CCIC gain is particularly great. Thus the CLNF of FIG. 4 or FIG. 5 provides a significant improvement over the CLNF of FIG. 2.

Referring again to FIG. 5 and the Table above, it can be seen that this improvement arises because a very large CCIC gain is maintained in the areas G4 and G5, which total half of the area 60, the white area G1 in which there is no improvement in the CCIC gain of 3 dB is halved to be only one quarter of the area 60, and the CCIC gain is doubled to 6 dB in the other areas G2, G3, and G6 which total one quarter of the area 60. The reduction in the area G1 is achieved as a result of the boundary lines between the areas G1, G3, G5 and the areas G2, G4, G6, and the boundary lines between the areas G3, G4 and G1, G2. As indicated above, these boundary lines correspond to exponents in the equation for $x_{48}(k)$, and hence arise as a result of the processing of signals including the squaring of the limited and low pass filtered complex signal by the complex signal multiplier 48.

It can be appreciated that the same principles can at least potentially be applied to processing higher order powers of the limited and low pass filtered complex signal in order to reduce further the area G1 while maintaining increased CCIC gains in other areas, whereby a further enhancement in the overall CCIC gain can be produced (with more extensive signal processing). For example, it can be seen that cubing the limited and low pass filtered complex signal $x_{41}(k)$ would result in a signal having a component with an exponent including the term $4\psi_s(k)-\psi_i(k)$, corresponding to boundary lines in a graph like that of FIG. 6 having the equation $4\psi_s(k)-\psi_i(k)=\pm B$, which could further reduce the area G1. Processing such a signal with other signals using the principles of this invention provides the potential for such further enhancements. These principles can be considered as comprising the following steps:

1. Determine signal combinations which can be derived from the output $x_{40}(k)$ of the complex signal limiter 40 and which have exponential components corresponding to boundary lines on an instantaneous frequency graph of the form of FIG. 3 or FIG. 6 which can reduce the area G1. This determination can include, for example, powers of the complex signal $x_{40}(k)$ before low pass filtering and/or the complex signal $x_{41}(k)$ after low pass filtering, and of complex conjugates of these signals, alone or in various combinations, and can take into account second-order or higher-order terms in the Taylor expansion of the equation for the complex signal $x_{40}(k)$.
2. Determine signal processing functions and combinations which, for each of the consequent areas of the instantaneous frequency graph, result in an enhancement of the CCIC gain for that area. Again, this determination can take into account second-order or higher-order terms as well as the first-order terms as in the above-described embodiments of the invention. In this determination, it is convenient first to identify the largest areas of the instantaneous frequency graph and to select signal processing functions and combinations which will substantially completely cancel the interference components in these areas (for example as in the areas G5 above).
3. Determine the resulting overall CCIC gain characteristic in accordance with equation (2) and select an optimum result.

It can be seen retrospectively that these principles are applied in the embodiments of the invention described above. Thus in step 1 a squaring (power of 2) of the limited and low pass filtered complex signal $x_{41}(k)$ in the complex signal multiplier 48 is selected, which as explained above gives rise to the boundary lines shown in FIG. 6 halving the area G1. In steps 2 and 3, signal processing functions and combinations, including the LPF 49, complex signal multiplier 50, the constant 3 applied to the complex signal multiplier 45, and the addition in the complex signal adder 46, are then determined, and an optimum result selected, in a manner which substantially completely cancels the interference components in the largest areas G5, and also in the areas G4, and enhances the CCIC gain in the other areas G2, G3, and G6.

It can be seen that in accordance with these principles various forms of the CLNF 12 can be arrived at with various levels of enhanced performance in return for various levels of increased signal processing. These and other equivalent arrangements can be provided in place of the particular form of the CLNF 12 described in detail above. For example, it can be appreciated that a directly equivalent arrangement to the form of the CLNF of FIG. 4 can be provided by squaring the complex conjugate of the signal $x_{41}(k)$, low pass filtering the result, and multiplying this by the normal (unconjugated) signal $x_{41}(k)$, instead of the other way round as described above. These and numerous other changes, variations, and adaptations may be made to the particular embodiments of the invention described above without departing from the scope of the invention as defined in the claims.

What is claimed is:

1. A method of reducing co-channel interference of a frequency modulated received signal, having a predetermined signal bandwidth, represented by a complex signal having samples x(k) where k is an integer, comprising the steps of:

amplitude limiting each sample to produce a limited sample substantially equal to $x(k)/|x(k)|$; and non-linearly filtering the limited samples to enhance cancellation of co-channel interference, the step of non-linearly filtering comprising the steps of:

producing different derivatives of the limited samples, the different derivatives including a derivative of at least one second or higher order power of the limited samples;

combining the different derivatives in a manner to enhance the cancellation of co-channel interference in the combination; and low pass filtering at least one of the derivatives, the limited samples, and the combination in accordance with the predetermined signal bandwidth.

2. A method as claimed in claim 1 wherein the limited samples are low pass filtered in accordance with the predetermined signal bandwidth to produce filtered samples, and the different derivatives are produced from the filtered samples.

3. A method as claimed in claim 2 wherein the step of producing different derivatives includes the step of producing squared filtered samples.

4. A method as claimed in claim 3 wherein the step of producing different derivatives further includes the step of low pass filtering the squared filtered samples.

5. A method as claimed in claim 4 wherein the steps of producing and combining the different derivatives include the step of forming a product of the low pass filtered, squared filtered samples with a complex conjugate of the filtered samples.

6. A method as claimed in claim 5 wherein the steps of producing and combining the different derivatives further include the steps of producing a product of the filtered samples with a complex conjugate of the filtered samples and removing d.c. components from the product to produce a resultant signal.

7. A method as claimed in claim 6 wherein the steps of producing and combining the different derivatives further include the steps of producing a product of the filtered samples, a constant 3, and said resultant signal, forming a difference between this product and a sum of the filtered samples and said product of the low pass filtered, squared filtered samples with the complex conjugate of the filtered samples, and low pass filtering the difference in accordance with the predetermined signal bandwidth.

8. A method as claimed in claim 7 wherein the step of low ass filtering the squared filtered samples comprises the sequential steps of up-sampling by a factor of 2, low pass filtering, and down-sampling by a factor of 2.

9. A method as claimed in claim 1 wherein the step of producing different derivatives includes the step of producing squared filtered samples.

10. A non-linear filter for reducing co-channel interference of a frequency modulated signal having a predetermined signal bandwidth and represented by amplitude limited complex signal samples, the non-linear filter comprising:

a first signal path including complex signal processing units arranged to multiply the complex signal samples by their complex conjugates and to high pass filter the products to produce resultant signal samples from which d.c. components are removed;

a second signal path including complex signal processing units arranged to produce derivative signal samples of at least one second or higher order power of the complex signal samples; and complex signal combining units arranged to combine the resultant signal samples of the first signal path, the derivative signal samples of the second signal path, and the complex signal samples to produce combined signal samples having less co-channel interference than the complex signal samples.

11. A non-linear filter as claimed in claim 10 and including a low pass filter, having a pass band corresponding to the predetermined signal bandwidth, via which the complex signal samples are supplied.

12. A non-linear filter as claimed in claim 11 and including a low pass filter, having a pass band corresponding to the predetermined signal bandwidth, arranged to filter the combined signal samples to produce output signal samples of the non-linear filter.

13. A nonlinear filter as claimed in claim 12 wherein the complex signal processing units of the second signal path include a multiplier arranged to square the complex signal samples, a low pass filter arranged to filter the squared samples, and a multiplier arranged to multiply the filtered squared signals by the complex conjugates of the complex signal samples to produce the derivative signal samples.

14. A non-linear filter as claimed in claim 13 wherein the complex signal processing units of the second signal path further include a two-times up-sampler preceding the low pass filter and a two-times down-sampler following the low pass filter.

15. A non-linear filter as claimed in claim 10 and including a low pass filter, having a pass band corresponding to the predetermined signal bandwidth, arranged to filter the combined signal samples to produce output signal samples of the non-linear filter.

16. A non-linear filter as claimed in claim 10 wherein the complex signal processing units of the second signal path include a multiplier arranged to square the complex signal samples, a low pass filter arranged to filter the squared samples, and a multiplier arranged to multiply the filtered squared signals by the complex conjugates of the complex signal samples to produce the derivative signal samples.

17. A non-linear filter as claimed in claim 16 wherein the complex signal processing units of the second signal path further include a two-times up-sampler preceding the low pass filter and a two-times down-sampler following the low pass filter.

18. A non-linear filter as claimed in claim 10 wherein the complex signal processing and combining units are provided as functions of a digital signal processor.

19. Apparatus for reducing co-channel interference of a frequency modulated received signal, having a predetermined signal bandwidth, represented by a complex signal having samples $x(k)$ where k is an integer, the apparatus comprising:

a complex signal limiter arranged to limit each sample to produce a limited sample substantially equal to $x(k)/|x(k)|$; and a non-linear filter as claimed in claim 11 to which the limited samples are supplied as said complex signal samples.

20. Apparatus for reducing co-channel interference of a frequency modulated received signal, having a predetermined signal bandwidth, represented by a complex signal having samples $x(k)$ where k is an integer, the apparatus comprising:

a complex signal limiter arranged to limit each sample to produce a limited sample substantially equal to $x(k)/|x(k)|$; and a non-linear filter as claimed in claim 13 to which the limited samples are supplied as said complex signal samples.

* * * * *